(12) United States Patent
Selvaraj et al.

(10) Patent No.: US 11,649,058 B2
(45) Date of Patent: May 16, 2023

(54) ICE PROTECTION SYSTEM FOR A COMPONENT OF AN AERODYNAMIC SYSTEM

(71) Applicant: Goodrich Corporation, Charlotte, NC (US)

(72) Inventors: Sugumaran Selvaraj, Karnataka (IN); Sathish Thangavel, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/462,751

(22) Filed: Aug. 31, 2021

(65) Prior Publication Data

US 2022/0048637 A1    Feb. 17, 2022

Related U.S. Application Data

(62) Division of application No. 16/176,443, filed on Oct. 31, 2018, now Pat. No. 11,136,131.

(30) Foreign Application Priority Data

Jul. 11, 2018    (IN) .............................. 201811025914

(51) Int. Cl.
  *B64D 15/12*    (2006.01)
  *B64D 15/04*    (2006.01)
  *F02C 7/047*    (2006.01)

(52) U.S. Cl.
  CPC .............. *B64D 15/12* (2013.01); *B64D 15/04* (2013.01); *F02C 7/047* (2013.01); *F05D 2220/323* (2013.01)

(58) Field of Classification Search
  CPC ...... F24H 9/0031; F24H 1/287; F28D 7/1676; F28D 7/1669; F28F 1/40; F28F 1/02; F28F 1/025; F28F 2215/10; F28F 13/06; F28F 13/08; F28F 2275/14
  See application file for complete search history.

(56) References Cited

U.S. PATENT DOCUMENTS

| 2,553,218 A | 5/1951 | Joseph et al. |
| 3,057,154 A | 7/1960 | William et al. |
| 3,925,979 A | 12/1975 | Ziegler |
| 3,933,327 A | 1/1976 | Cook et al. |
| 4,250,250 A | 2/1981 | Miyakawa et al. |

(Continued)

FOREIGN PATENT DOCUMENTS

| DE | 4414205 A1 | 10/1995 |
| EP | 3093236 A1 | 11/2016 |

OTHER PUBLICATIONS

European Search Report; dated May 3, 2022; Application No. 22150606.6-1004; Filed: Jul. 9, 2019; 8 pages.

(Continued)

*Primary Examiner* — Steven S Anderson, II
(74) *Attorney, Agent, or Firm* — Cantor Colburn LLP

(57) ABSTRACT

Disclosed is an ice protection system for an aerodynamic surface of an aircraft, a surface having a flow facing side and an inwardly facing side that opposes the flow facing side, the system having: a perforated sheet configured for disposal in the surface; a heating source connected to the perforated sheet; and a suction source disposed to draw ice melted by the heating source through the perforated sheet and heating source.

5 Claims, 3 Drawing Sheets

(56) References Cited

U.S. PATENT DOCUMENTS

| | | | |
|---|---|---|---|
| 6,202,304 B1 | 3/2001 | Shatz | |
| 6,688,558 B2 | 2/2004 | Breer et al. | |
| 8,959,768 B2 | 2/2015 | Vauchel et al. | |
| 9,809,298 B2 | 11/2017 | Okamoto et al. | |
| 2007/0210073 A1* | 9/2007 | Hubert | B64D 15/12 219/535 |
| 2010/0116943 A1 | 5/2010 | Meister | |
| 2016/0311542 A1* | 10/2016 | Mackin | B64D 15/08 |
| 2016/0332724 A1 | 11/2016 | Mehring | |
| 2017/0081020 A1 | 3/2017 | Pujar et al. | |
| 2019/0023405 A1* | 1/2019 | Reissig | B64D 15/04 |
| 2020/0017223 A1 | 1/2020 | Selvaraj et al. | |

OTHER PUBLICATIONS

European Office Action Issued in European Application No. 19185339.9-1010 dated Oct. 20, 2020; 7 Pages.

European Search Report Issued in European Application No. 19185339.9-1010 dated Oct. 8, 2019; 9 Pages.

* cited by examiner

ICE PROTECTION SYSTEM FOR A COMPONENT OF AN AERODYNAMIC SYSTEM

CROSS-REFERENCE TO RELATED APPLICATIONS

This application is a division of U.S. application Ser. No. 16/176,443 filed Oct. 31, 2018, which claims the benefit of Indian Application No. 201811025914 filed Jul. 11, 2018, which is incorporated herein by reference in their entirety.

BACKGROUND

Exemplary embodiments pertain to the art of deicing of components of aerodynamic systems and more specifically to an ice protection system for skins of nacelles and control surfaces.

Safety is a primary concern in the design or power propulsion systems for aircraft applications. The formation of ice on aircraft wings, propellers, air inlets of engines, etc., has been a problem since the earliest days of heavier-than-air flight. Any accumulated ice adds considerable weight, and changes the airfoil or inlet configuration thereby making the aircraft much more difficult to fly and, in some cases, has caused loss of aircraft. In the case of jet aircraft, large pieces of ice breaking loose from the leading edge of an engine inlet housing can severely damage rotating fan and compressor blades which extend across the flow path and interact with the working fluid or other internal engine components and cause engine failure.

Many attempts have been made to overcome the problems and dangers of aircraft icing. Anti-ice systems for the inlet area of nacelles for aircraft propulsion systems have been the focus of a significant amount of research and development within the aircraft industry. For example, proposals have been made, to mechanically vibrate external surfaces to break ice loose or to generate electromagnetic pulses in the aircraft skin to break ice loose. These systems, however tend to be heavy and complex and to remove only existing ice, rather than prevent ice formation.

Heating areas of the aircraft prone to icing has been suggested many times. The heating schemes suggested range from microwave heating to feeding hot gases through holes in the skin, to resistance heating of the surfaces to actually burning fuel adjacent to ice-prone surfaces.

One of the most common anti-icing techniques has been the ducting of hot gases into a housing adjacent to the likely icing area. Typical of the patents describing such hot gas techniques are U.S. Pat. Nos. 3,057,154; 3,925,979; 3,933,327 and 4,250,250. In each case, the hot gas conduits simply dump hot gases into the housing, such as the leading edge of a jet engine housing or a wing leading edge. While often useful, these systems are not fully effective due to the complexity of the hot gas duct system.

In addition, with known techniques, melted ice may shed as a water film, which may form ice runback downstream of the heater. The runback may shed into, for example, an engine core under aerodynamic forces. In a gas turbine engine, the runback may lead to core icing, component impact damage and engine flame out. On wing, runback ice may adversely affect aerodynamic shapes and thus aerodynamic performance.

BRIEF DESCRIPTION

Disclosed is an ice protection system for an aerodynamic surface of an aircraft, a surface having a flow facing side and an inwardly facing side that opposes the flow facing side, the system comprising: a perforated sheet configured for disposal in the surface; a heating source connected to the perforated sheet; and a suction source disposed to draw ice melted by the heating source through the perforated sheet and heating source.

In addition to one or more of the above disclosed features and elements or as an alternate the heating source is integral with the perforated sheet.

In addition to one or more of the above disclosed features and elements or as an alternate the heating source includes a drain hole extending between the perforated sheet and the suction source.

In addition to one or more of the above disclosed features and elements or as an alternate the ice protection system comprises a honeycomb support structure on an inward side of the perforated sheet.

In addition to one or more of the above disclosed features and elements or as an alternate the ice protection system comprises a water collector on an inwardly facing side of the honeycomb support structure.

In addition to one or more of the above disclosed features and elements or as an alternate the suction source is a pump fluidly connected to the water collector.

In addition to one or more of the above disclosed features and elements or as an alternate the ice protection system includes a rigid shell on an inward facing side of the water collector.

In addition to one or more of the above disclosed features and elements or as an alternate the ice protection system is coupled to a leading edge thereof.

In addition to one or more of the above disclosed features and elements or as an alternate the component is a nacelle or an aircraft control surface on a wing or empennage.

In addition to one or more of the above disclosed features and elements or as an alternate the component is a wing or empennage.

Further disclosed is method of preventing ice formation with an ice protection system on a surface of a component of an aerodynamic system, the surface having a flow facing side and an inwardly facing side that opposes the flow facing side, the method comprising: heating the surface with a heating source of the ice protection system, and providing suction on an inwardly facing side of the heating source with a suction source to draw water melted by heating the surface through the heating source into a water collector.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
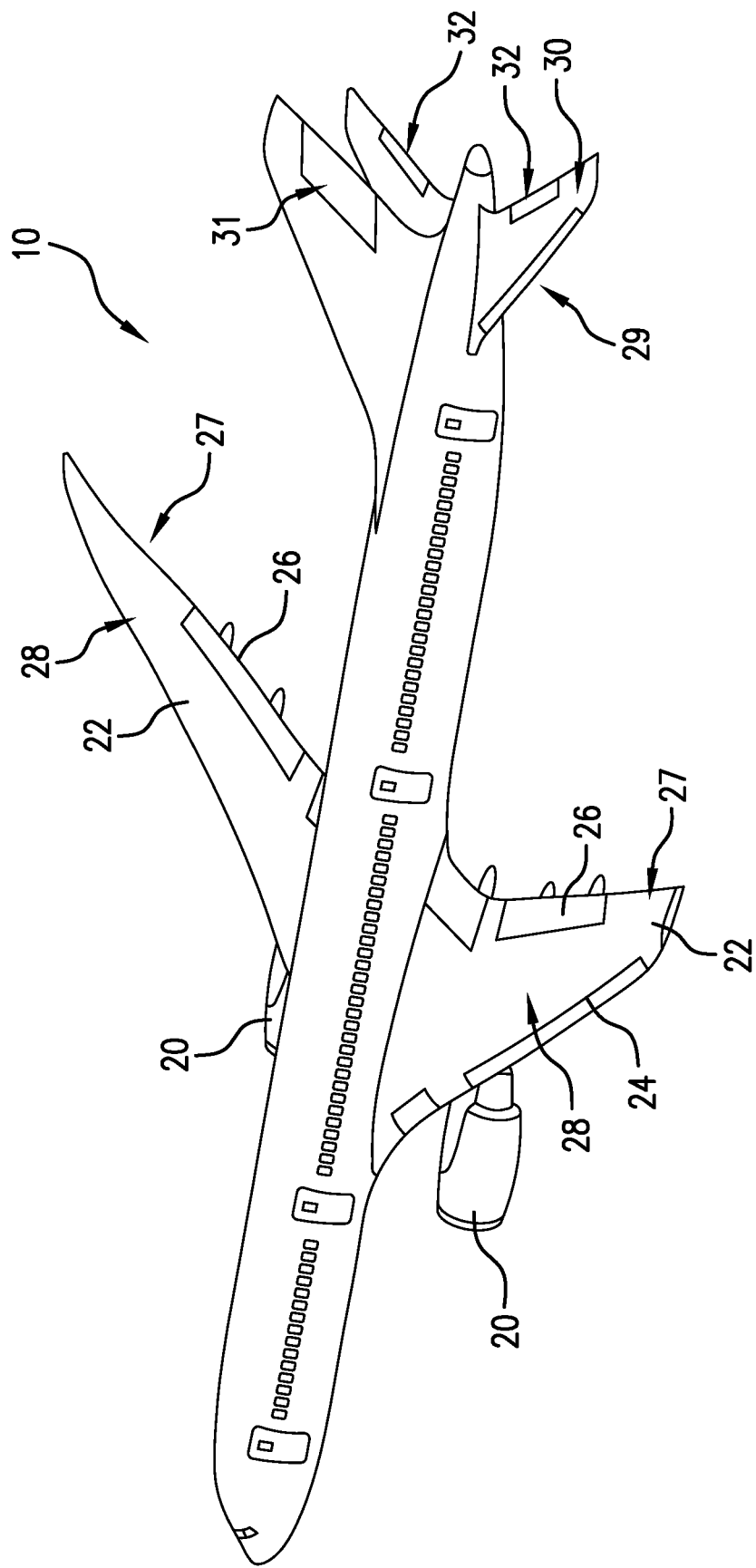
FIG. 1 is a perspective view of an aircraft that includes aerodynamic surfaces where embodiments of the present invention can be implemented.

FIG. 1 illustrates an example of a commercial aircraft 10 having aircraft engines surrounded by (or otherwise carried in) a nacelles 20. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems. The leading edges of the wings and nacelles are especially vulnerable to the formation of ice.

Figure 2A:
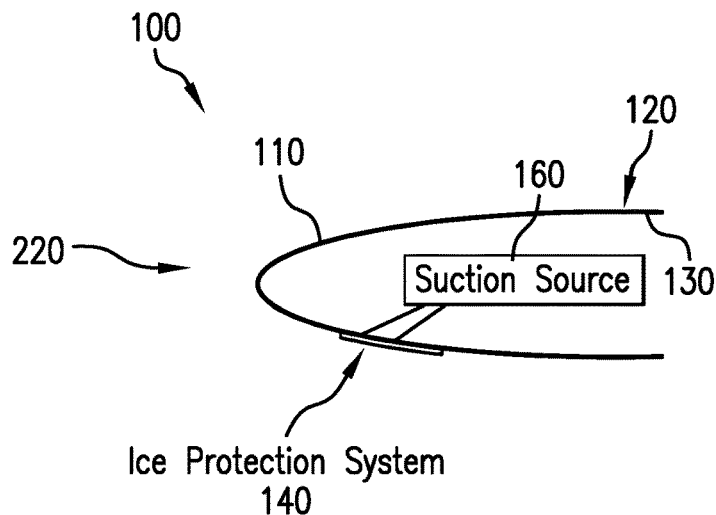
FIGS. 2A and 2B illustrate one or more components of an aerodynamic system with an ice protection system coupled thereto according to the disclosure.
Figure 2B:
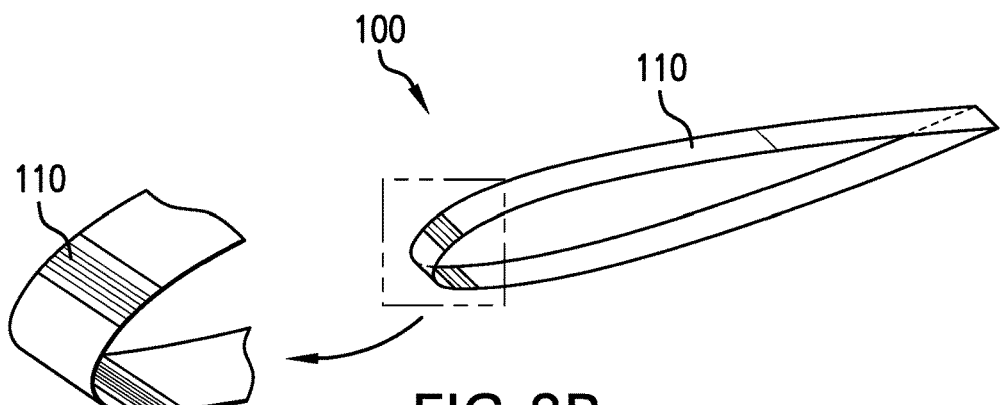
Figure 3:
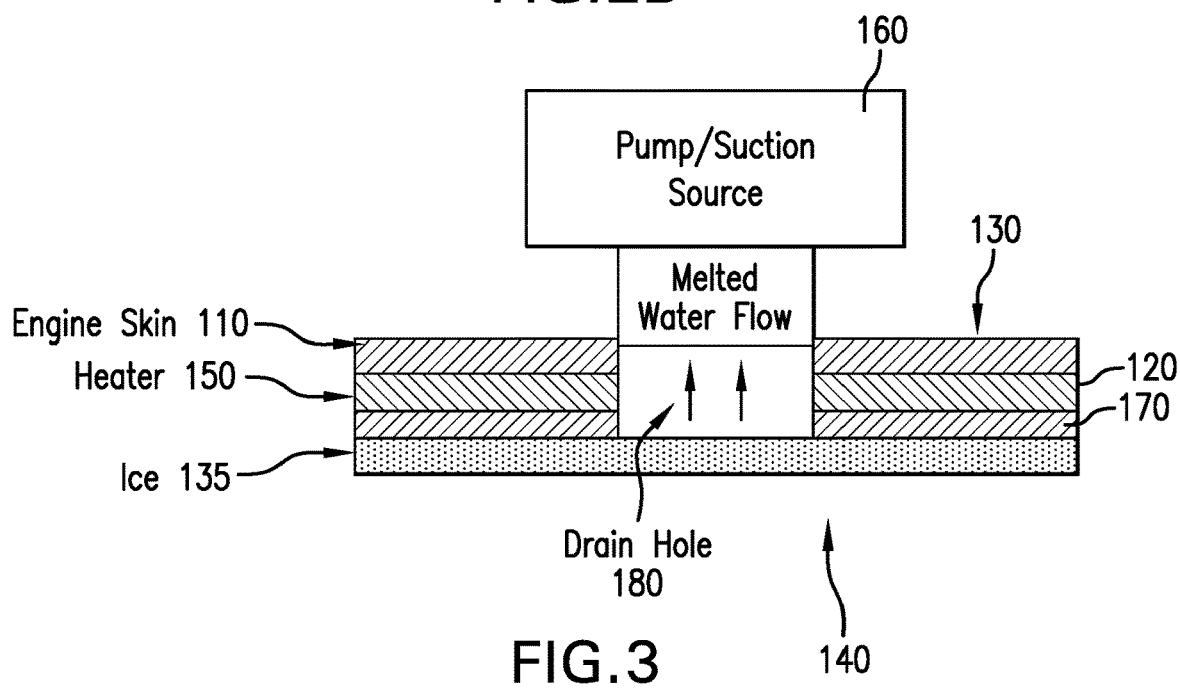
FIG. 3 is a view of an ice protection system according to the disclosure.

Turning now to FIGS. 2A, 2B and 3, disclosed is a component 100 of an aerodynamic system, which may be for example a nacelle for an aircraft engine 20 or a leading edge of a wing 20 or any control surface thereon. Generally, the component 100 may comprise a surface 110. The surface 110 may have a flow facing side 120 and an inwardly facing side 130 opposite the flow facing side 120. The surface 110 may be connected to an ice protection system 140. The ice protection system 140 may be, for example, used to dynamically prevent and/or melt a layer of ice 135 that may build up on the surface 110.

The ice protection system 140 may comprise a heating source 150 that is flow facing and disposed in a protected zone for the component 100, whereat the surface 110 is porous to allow heat to transfer therethrough. The heating source may be electric, though other sources of heat may be available depending on the location of the ice protection system 140. For example heat may be obtained with air bled off the engine and, as such, can be referred to as bleed air.

A suction source 160 may be disposed within the surface and draw fluid from the flow facing side 120 to the inwardly facing side 120. As illustrated in FIG. 3, the heating source 150 is closer to the surface than the suction source 160. The suction source may 160 be a powered pump, though other sources of suction may be available depending on the location of the ice protection system 140. For example, suction may be obtained by a conduit connected to a low pressure location in or around the engine.

In one embodiment illustrated in FIG. 3 the ice protection system 140 on a flow facing side of the heating source 150 may comprise a perforated sheet 170. In one embodiment, the heating source 150 is at least partially porous, allowing melting ice to travel between the flow side of the heating source 150 and the inwardly facing side of the heating source 150. In one embodiment the ice protection system may include a drain hole 180 in the heating source 150. The drain hole 180 may extend between the perforated sheet 170 and the suction source 160.

Figure 4:
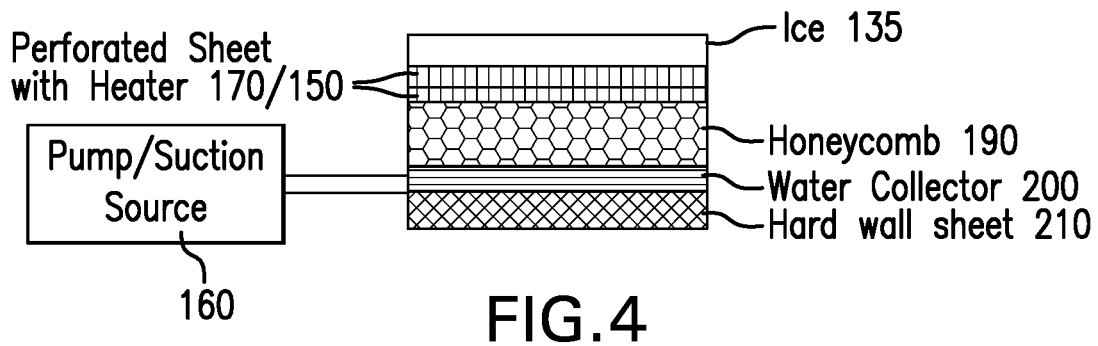
FIG. 4 is view of a portion of an ice protection system according to the disclosure.
Figure 5:
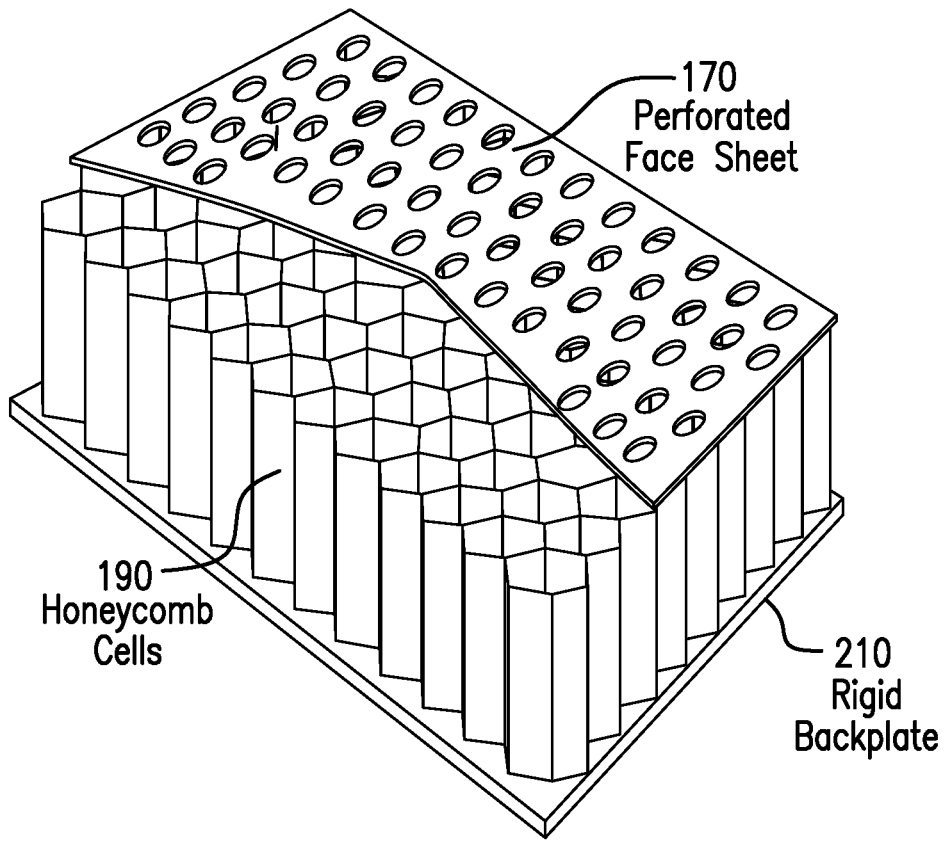
FIG. 5 is another view of an ice protection system according to the disclosure.

Turning to FIGS. 4 and 5, in one embodiment the ice protection system 140 may include a honeycomb cell support structure 190. The honeycomb cell support structure 190 may support the heating source 150 and perforated sheet 170 on its flow facing side.

The ice protection system 140 may comprise a water collector 200 on an inwardly facing side of the honeycomb cell support structure 190. The water collector may collect water that forms from the melted ice layer 135. Collected water may be used, e.g., for cooling purposes.

In one embodiment the ice protection system 140 includes a rigid shell 210 on an inward side of the water collector 200. The rigid shell 210 may be a hard wall sheet that fixedly supports the ice protection system 140.

Turning back to FIG. 2, the component 100 may be a nacelle or control surface of the aerodynamic system such as a wing, with the ice protection system 140 coupled thereto. However, other components of an engine or aircraft which may experience ice formation due to an exposure to airflow are within the scope of the disclosure. The surface 110 may for example an external skin at a leading edge of the nacelle 100, that is, at an intake lip 220, or a leading edge of a wing, such as on a slat.

The above disclosed embodiments may reduce/eliminate the runback of ice by draining the melted ice/water flow through the porous heater 150 on, for example, a leading edge or one or more deicing zones of the nacelle 100. The disclosed embodiments may provide one or more drain holes 180 at, for example, protected and unprotected zones of the nacelle 100 to remove water film formed form the melted ice 135. The one or more drain holes 180 may be provided with a porous heater 150 and an external suction mechanism 160 may provide drainage for the melted flow. The suction source 160 may be activated along with the heater 150 and drained water may be stored and/or disposed. The embodiments may provide reduction and/or elimination of runback ice, an improved aerodynamic performance, reduced drag and enhanced fuel efficiency. Moreover the embodiments may provide a reduced downstream heating requirements (power and wear) due to reduced water and ice contact on downstream surfaces in the engine.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of preventing ice formation with an ice protection system on a surface of a component of an aerodynamic system, the surface having a flow facing side and an inwardly facing side that opposes the flow facing side, the method comprising:

heating the surface with a heating source of the ice protection system, and providing suction on an inwardly facing side of the surface with a suction source to draw water melted by heating the surface through the heating source into a water collector, wherein:

a flow facing side of the heating source comprises a perforated sheet;

the heating source includes a drain hole extending between the perforated sheet and the suction source;

the ice protection system comprises a honeycomb support structure on an inward side of the perforated sheet and a water collector on an inwardly facing side of the honeycomb support structure; and the suction source is a pump fluidly connected to the water collector.

2. The method of claim 1, wherein the ice protection system comprises a rigid shell on an inward facing side of the water collector.

3. The method of claim 2, wherein the ice protection system is coupled to a leading edge of the component.

4. The method of claim 3, wherein the component is a nacelle.

5. The method of claim 3, wherein the component is a wing.

\* \* \* \* \*